United States Patent
Wilcox et al.

(10) Patent No.: US 12,013,310 B2
(45) Date of Patent: Jun. 18, 2024

(54) SYSTEMS AND METHODS FOR MONITORING ENGINE STARTING SYSTEMS

(71) Applicant: Deere & Company, Moline, IL (US)

(72) Inventors: Timothy A. Wilcox, Cissna Park, IL (US); Terence D. Pickett, Waukee, IA (US); Trong Duong, Cary, NC (US); Larry D. Kassens, Horicon, WI (US); Sean M. Kennelly, Cary, NC (US)

(73) Assignee: Deere & Company, Moline, IL (US)

( * ) Notice: Subject to any disclaimer, the term of this patent is extended or adjusted under 35 U.S.C. 154(b) by 229 days.

(21) Appl. No.: 17/545,875

(22) Filed: Dec. 8, 2021

(65) Prior Publication Data

US 2023/0175926 A1 Jun. 8, 2023

(51) Int. Cl.
*G01M 15/05* (2006.01)
*G06N 20/00* (2019.01)

(52) U.S. Cl.
CPC ............ *G01M 15/05* (2013.01); *G06N 20/00* (2019.01)

(58) Field of Classification Search
CPC ................................ G01M 15/05; G06N 20/00
See application file for complete search history.

(56) References Cited

U.S. PATENT DOCUMENTS

| | | |
|---|---|---|
| 2005/0182536 A1 | 8/2005 | Doyle et al. |
| 2013/0046435 A1 | 2/2013 | Shin et al. |
| 2019/0285041 A1 | 9/2019 | Chen et al. |

OTHER PUBLICATIONS

Extended European Search Report and Written Opinion issued in European Patent Application No. 22201773.3, dated May 3, 2023, in 09 pages.

*Primary Examiner* — Eric S. McCall
(74) *Attorney, Agent, or Firm* — Hanley, Flight & Zimmerman, LLC

(57) ABSTRACT

Methods, apparatus, systems, and articles of manufacture are disclosed to monitor engine starting systems. An example apparatus includes processor circuitry to execute instructions to measure engine starting system data from a machine; determine a total starting crank time and an ambient air temperature for the machine from the engine starting system data; compare the engine starting system data using a machine learning model; model a relationship between the ambient air temperature and the total starting crank time; generate a score of an engine starting system from the machine learning model; determine comparison result from the relationship between the ambient air temperature and the total starting crank time; and display an alert to a user based on at least one of the score of the engine starting system or the comparison result from the relationship between the ambient air temperature and the total starting crank time.

30 Claims, 9 Drawing Sheets

SYSTEMS AND METHODS FOR MONITORING ENGINE STARTING SYSTEMS

FIELD OF THE DISCLOSURE

This disclosure relates generally to vehicle engines and, more particularly, to systems and methods for monitoring engine starting systems.

BACKGROUND

Machine engines include starting systems to make the engine begin operating. Typically, to make an engine start, the engine is turned at a speed to pull in fuel and air into the cylinders. In some examples, an electric starter motor completes the turning of the engine. In such examples, the electric starter motor requires a heavy electric current, which the electric starter motor draws from the battery. In other examples, a spark plug delivers electric current to a combustion chamber of the engine to ignite compressed fuel and air in the cylinders via an electric spark. In such examples, the spark plug obtains the electric current from the battery via an ignition coil. Over time, the battery as well as other components in the engine starting system (e.g., the electric starter motor, cables, etc.) can begin to degrade with use.

Figure 1:
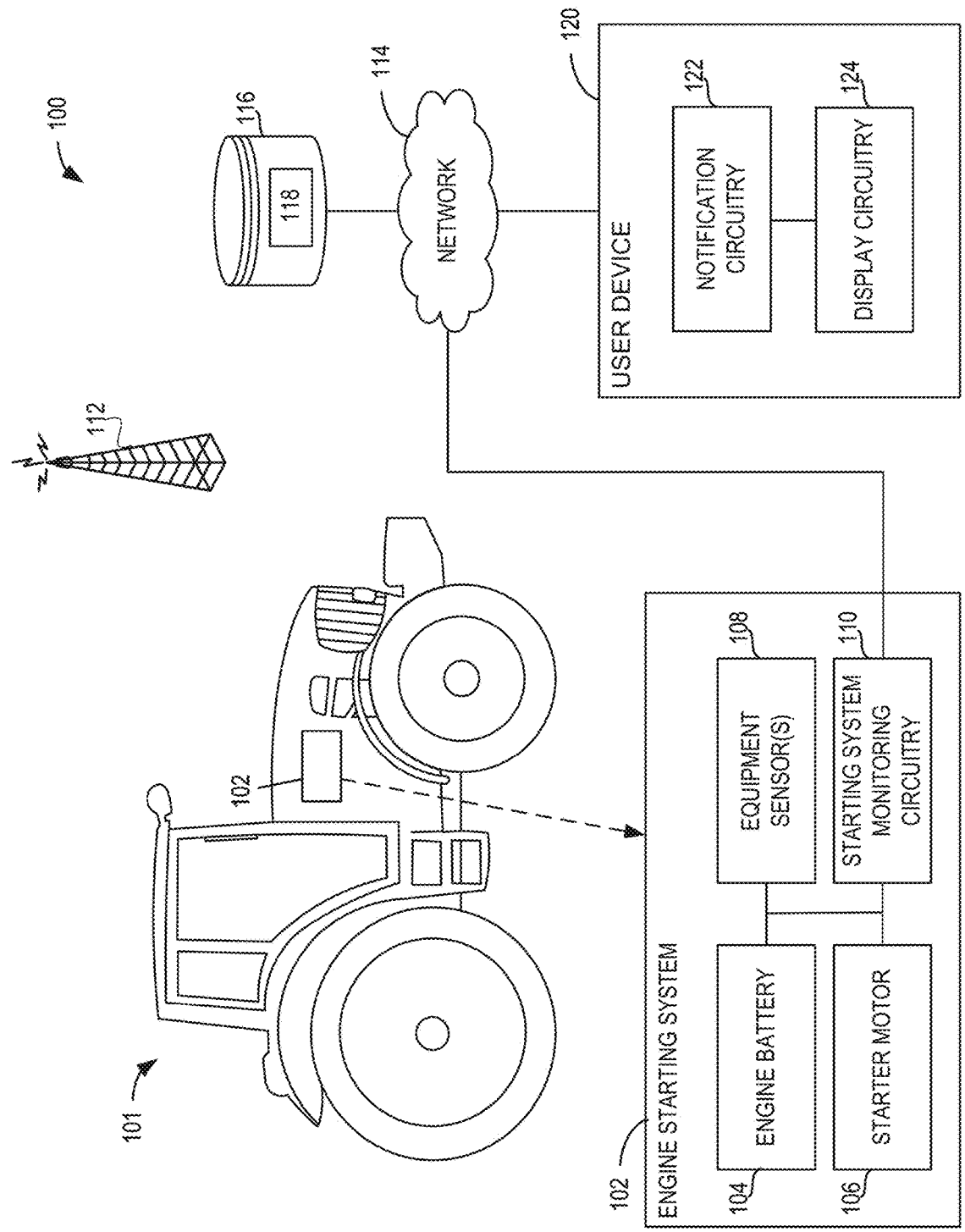
FIG. 1 is a schematic illustration of an example environment in which teachings of this disclosure may be implemented.

The figures are not to scale. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Machine engines include starting systems to make the engine begin operating. Typically, to make an engine start, the engine is turned at a speed to pull in fuel and air into the cylinders. In some examples, an electric starter motor completes the turning of the engine. In such examples, the electric starter motor requires a heavy electric current, which the electric starter motor draws from the battery. In other examples, a spark plug delivers electric current to a combustion chamber of the engine to ignite compressed fuel and air in the cylinders via an electric spark. In such examples, the spark plug obtains the electric current from the battery via an ignition coil. Engine starting systems are critical to operation of equipment, and often fail unexpectedly due to different factors. For example, over time, the battery as well as other components in the engine starting system (e.g., the electric starter motor, cables, etc.) can begin to degrade with use. However, many of the factors that can lead to the failure of equipment in the engine starting system can be predicted by monitoring and regularly servicing key elements of the systems (e.g., the battery, starter motor, etc.).

Examples disclosed herein monitor an engine starting system and corresponding equipment to identify engine starting characteristics indicative of degradation. In examples disclosed herein, engine starting characteristics can include an initial voltage of the battery, battery voltage during a start cycle, ambient air temperature during the start cycle, etc. Examples disclosed herein collect the engine starting characteristics continuously during the life of the product/machine. Examples disclosed herein use the historical engine starting system characteristics to generate a model for determining the health of the engine starting system. Examples disclosed herein update the model throughout the life of the product/machine as more engine starting characteristics are collected. Examples disclosed herein determine a score of the health of the engine starting system based on the model and collected engine starting characteristics. Examples disclosed herein use the score of the health of the engine starting system to identify potential degradation of the components (e.g., the battery, cables, the starter motor, etc.). In examples disclosed herein, a product/machine operator can track the health of the engine starting system at any time through a wireless connection. Examples disclosed herein allow a product/machine operator to regularly check and service components of the engine starting system based on the health score of the engine starting system. Example disclosed herein allow for a product/machine operator to identify degradation in the components of the engine starting system before failure of the equipment, which allows time for servicing or replacement of the degrading component without losing operation of the product/machine.

FIG. 1 is a schematic illustration of an example environment 100 in which teachings of this disclosure may be implemented. The example environment 100 includes an example machine 101 and an example engine starting system 102. In the illustrated example of FIG. 1, the example engine starting system 102 includes an example engine battery 104, an example starter motor 106, example equipment sensor(s) 108, and example starting system monitoring circuitry 110. The example environment 100 of FIG. 1 further includes an example cell tower 112, an example network 114, an example database 116, and an example user device 120. In the illustrated example, the example user device 120 include example notification circuitry 122 and example display circuitry 124.

In the illustrated example of FIG. 1, the example machine 101 is an agriculture vehicle (e.g., a tractor, front loader, harvester, cultivator, etc.). However, the machine 101 can be any other suitable vehicle, machine, and/or product that includes an engine starting system to operate such as, for example, a mower, lawn equipment, etc. In examples disclosed herein, the machine 101 is equipped with the example engine starting system 102 to operate. In the illustrated example of FIG. 1, the example engine starting system 102 includes the example engine battery 104, the example starter motor 106, and the example equipment sensor(s) 108. In examples disclosed herein, the starter motor 106 turns an engine of the machine 101 at a speed to pull in fuel and air in cylinders to start operation of the machine 101. The example starter motor 106 requires heavy electric current to operate. In the illustrated example, the starter motor 106 draws electric current from the engine battery 104. In the illustrated example, the equipment sensor(s) 108 include a plurality of sensors to monitor components in the engine starting system 102 (e.g., the engine battery 104, the starter motor 106, etc.). In some examples, the equipment sensor(s) 108 include sensors to measure the voltage of the engine battery 104 during different periods of time during operation of the machine 101. In some examples, the equipment sensor(s) 108 also include temperature sensors that measure an ambient temperature of the engine starting system 102.

In the illustrated example of FIG. 1, the example starting system monitoring circuitry 110 monitor the engine starting system 102 to identify engine starting characteristics indicative of degradation in the engine starting system 102. The example starting system monitoring circuitry 110 collect the engine starting characteristics from the example equipment sensor(s) 108. The example starting system monitoring circuitry 110 use the engine starting characteristics with a machine learning model for determining the health of the engine starting system 102 to determine a score of the health of the engine starting system 102. In the illustrated example of FIG. 1, the starting system monitoring circuitry 110 has mobile connectivity to store the engine starting characteristics and receive historical engine starting system characteristics for generating the machine learning model for determining the health of the engine starting system 102. In some examples, the starting system monitoring circuitry 110 uses the example cell tower 112 to communicate with external devices (e.g., the example user device 120, etc.). In some examples, the starting system monitoring circuitry 110 communicates with external devices (e.g., the example database 116, the example user device 120, etc.) via the example network 114. In some examples, the network 114 can be the Internet or any other suitable external network.

In some examples, the starting system monitoring circuitry 110 transmits the collected engine starting characteristics to the example database 116 for storage. In the illustrated example, the database 116 stores the collected engine starting characteristics as example historical engine starting system characteristics 118. In some examples, the database 116 stores historical engine starting system characteristics 118 from a plurality of machines in addition to the example machine 101. In some examples, the database 116 stores the historical engine starting system characteristics 118 with associated timestamp data (e.g., date, time, etc.) for when the engine starting characteristics were collected from the engine starting system 102. The example database 116 is implemented by any memory, storage device, and/or storage disc for storing data such as, for example, flash memory, magnetic media, optical media, solid state memory, hard drive(s), thumb drive(s), etc. Furthermore, the historical engine starting system characteristics 118 stored in the database 116 may be in any data format such as, for example, binary data, comma delimited data, tab delimitated data, structured query language (SQL) structures, etc. In FIG. 1, the example database 116 is an organized collection of data, stored on a computational system that is electronically accessible. For example, the database 116 may be stored on a server, a desktop computer, an HDD, an SSD, or any other suitable computing system.

In the illustrated example, the starting system monitoring circuitry 110 uses the collected engine starting characteristics from the equipment sensor(s) 108 and the historical engine starting system characteristics 118 from the database 116 to determine the score of the health of the engine starting system 102. The starting system monitoring circuitry 110 determines if the score of the health of the engine starting system 102 indicates degradation in the equipment of the engine starting system 102. The starting system monitoring circuitry 110 generates an alert to the operator of the machine 101 when the determined score of the health of the engine starting system 102 indicates degradation in the engine starting system 102. In some examples, the starting system monitoring circuitry 110 transmits the alert to the example user device 120 associated with the operator of the machine 101. In some examples, the starting system monitoring circuitry 110 transmits the alerts to the user device 120 via the network 114 or the cell tower 112.

In the illustrated example, the example user device 120 includes the example notification circuitry 122 and the example display circuitry 124 to communicate the alert from the starting system monitoring circuitry 110 to the operator of the machine 101. The notification circuitry 122 receives the alerts from the example starting system monitoring circuitry. In FIG. 1, the display circuitry 124 is an interactive display which presents the alert message to the operator of the machine 101. In some examples, the alert message includes information on the detected degradation in the engine starting system 102 as determined by the example starting system monitoring circuitry 110. In some examples, the alert message includes information on an estimated timeframe for how long the component that is degrading will remain operating before complete failure based on the machine learning model included in the starting system monitoring circuitry 110. For example, the alert message may indicate that a component (e.g., the battery) has about one week before complete degradation. In some examples, the display circuitry 124 can display the alert to the user/operator via an application on the user device 120, a notification in a cloud environment, an email to the user/operator, etc. The example notification circuitry 122 and the example display circuitry 124 for the operator to identify degradation in the components of the engine starting system 102 before failure of the equipment, which allows time for servicing or replacement of the degrading component (e.g., the engine battery 104, the started motor 106, etc.) without losing operation of the machine 101.

Figure 2:
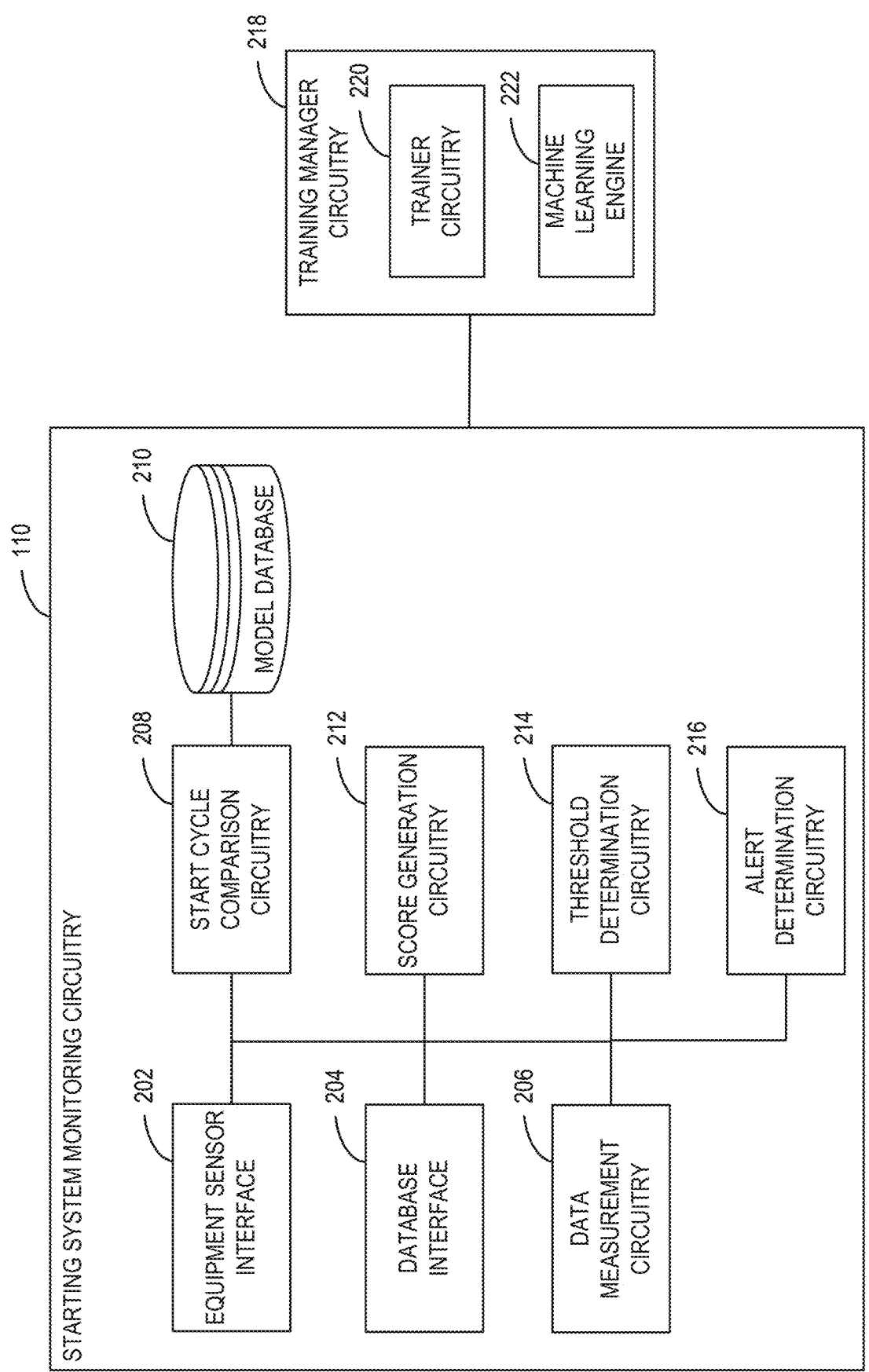
FIG. 2 is a block diagram of an example engine starting system monitoring circuitry included in the example starting system in the example environment of FIG. 1 and an example training manager circuitry.

FIG. 2 is a block diagram of an example starting system monitoring circuitry 110 included in the example engine starting system 102 in the example environment 100 of FIG. 1 and an example training manager circuitry 218. In the illustrated example of FIG. 2, the example starting system monitoring circuitry 110 includes an example equipment sensor interface 202, an example database interface 204, example data measurement circuitry 206, example start cycle comparison circuitry 208, an example model database 210, example score generation circuitry 212, example threshold determination circuitry 214, and example alert determination circuitry 216. In the illustrated example of FIG. 2, the example training manager circuitry 218 includes example trainer circuitry 220 and an example machine learning engine 222.

The example equipment sensor interface 202 measures engine starting system characteristics/data from the example machine 101 of FIG. 1. The equipment sensor interface 202 collects the engine starting system characteristics/data from the example equipment sensor(s) 108 of FIG. 1. In examples disclosed herein, the engine starting system characteristics/data includes an initial voltage of the engine battery 104 of FIG. 1, voltage of the engine battery 104 during a start cycle, and the ambient air temperature of the engine starting system 102 of FIG. 1 during the start cycle. In some examples disclosed herein, the equipment sensor interface 202 may communicate via any suitable wired and/or wireless communication method to obtain the engine starting system characteristics from, at least, the equipment sensor(s) 108.

In some examples, the starting system monitoring circuitry 110 includes means for collecting the engine starting system characteristics/data. For example, the means for collecting may be implemented by the example equipment sensor interface 202. In some examples, the equipment sensor interface 202 may be implemented by machine executable instructions such as that implemented by at least block 402 of FIG. 4 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the equipment sensor interface 202 is implemented by other hardware logic circuitry, hardware implemented state machines, and/or any other combination of hardware, software, and/or firmware. For example, the equipment sensor interface 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example database interface 204 collects historical engine starting system data (e.g., the historical engine starting system characteristics 118 of FIG. 1) and associated timestamp data from the example database 116 of FIG. 1. In some examples, the database interface 204 collects the historical engine starting system data from a plurality of external devices (e.g., machines, user devices, etc.).

In the illustrated example of FIG. 1, the example data measurement circuitry 206 determines engine measurements from the engine starting system characteristics/data collected by the example equipment sensor interface 202. The data measurement circuitry 206 determines a total starting crank time from the engine starting system characteristics/data. In examples disclosed herein, the total starting crank time is an amount of time between when a user/operator attempts to start the machine 101 (e.g., the user to attempt to start the machine 101 via a key, a button, etc.) and when the engine starting system 102 of the machine 101 starts. In some examples, the data measurement circuitry 206 determines the total starting crank time based on the engine starting system characteristics/data (e.g., the voltage of the engine battery 104, etc.). The example data measurement circuitry 206 determines an ambient air temperature of the engine starting system 102 based on the engine starting system characteristics/data.

In some examples, the starting system monitoring circuitry 110 includes means for measuring engine stating system characteristics/data. For example, the means for measuring may be implemented by the example data measurement circuitry 206. In some examples, the data measurement circuitry 206 may be implemented by machine executable instructions such as that implemented by at least blocks 406, 408 of FIG. 4 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the data measurement circuitry 206 is implemented by other hardware logic circuitry, hardware implemented state machines, and/or any other combination of hardware, software, and/or firmware. For example, the data measurement circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example start cycle comparison circuitry 208 determines the engine health from the engine starting system characteristics/data. In some examples, the start cycle comparison circuitry 208 applies a machine learning model to the engine measurements determined by the example data measurement circuitry 206. The start cycle comparison circuitry 208 compares the collected engine starting system characteristics/data and the historical engine starting system data 118 using the machine learning model. In some examples, the start cycle comparison circuitry 208 obtains the machine learning model from the example model database 210. In the illustrated example, the model database 210 stores the model to determine the health of the engine starting system 102 generated by the example training manager circuitry 218, which is described in further detail below. The model database 210 is implemented by any memory, storage device, and/or storage disc for storing data such as, for example, flash memory, magnetic media, optical media, solid state memory, hard drive(s), thumb drive(s), etc. In some examples, the start cycle comparison circuitry 208 models a relationship between the ambient air temperature and the total starting crank time determined by the data measurement circuitry 206. The start cycle comparison circuitry 208 maps how the ambient air temperature and the total starting crank time relate during the start cycle for the engine starting system 102 to determine the health of the engine starting system 102 of the machine 101. In some examples, the start cycle comparison circuitry 208 models the battery voltage determined from the data measurement circuitry 206 over time based on the historical engine starting system data 118 and associated timestamps. For example, the start cycle comparison circuitry 208 models the initial battery voltage over time when the engine starting system 102 is discharged to determine if the battery is maintaining a charge (e.g., the voltage is dropping quickly after discharging the engine). In other examples, the start cycle comparison circuitry 208 models the battery voltage related to an internal or external charging system of the machine 101. For example, the start cycle comparison circuitry 208 monitors the battery voltage over time as a charging current is applied to the battery (e.g., the engine battery 104).

In some examples, the starting system monitoring circuitry 110 includes means for comparing the engine starting system characteristics/data. For example, the means for comparing may be implemented by the example start cycle comparison circuitry 208. In some examples, the start cycle comparison circuitry 208 may be implemented by machine executable instructions such as that implemented by at least blocks 410, 502, 504 of FIGS. 4 and 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the start cycle comparison circuitry 208 is implemented by other hardware logic circuitry, hardware implemented state machines, and/or any other combination of hardware, software, and/or firmware. For example, the start cycle comparison circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example score generation circuitry 212 generates a score of the health of the engine starting system 102 from the machine learning model applied by the example start cycle comparison circuitry 208. In the illustrated example, the score generation circuitry 212 determines a comparison result from the relationship between the ambient air temperature and the total starting crank time. In some examples, the score generation circuitry 212 performs an analysis of the relationship between the ambient air temperature and total starting crank time. For example, the score generation circuitry 212 integrates under a curve of the relationship between the ambient air temperature and the total starting crank time to determine power usage of the engine starting system 102. In some examples, the score generation circuitry 212 determines a storage capacity of the engine battery 104 of FIG. 1 based on the power usage of the engine starting system 102 over time during operation. In some examples, the score generation circuitry 212 determines a storage capacity of the engine battery 104 based on the battery voltages (e.g., initial voltage after engine discharge, voltage during/after charging, etc.).

In some examples, the starting system monitoring circuitry 110 includes means for generating a score of an engine starting system. For example, the means for generating may be implemented by the example score generation circuitry 212. In some examples, the score generation circuitry 212 may be implemented by machine executable instructions such as that implemented by at least blocks 506, 508 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the score generation circuitry 212 is implemented by other hardware logic circuitry, hardware implemented state machines, and/or any other combination of hardware, software, and/or firmware. For example, the score generation circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example threshold determination circuitry 214 determines if the score of health of the engine starting system 102 from the start cycle comparison circuitry 208 satisfies a first threshold. In some examples, the first threshold is a minimum value of the score for the health of the engine starting system 102 without degradation (e.g., a minimum of the range considered healthy operations in the engine starting system 102). In some examples, the first threshold is predetermined for the engine starting system 102 (e.g., by a manufacturer). In other examples, the first threshold is adjusted over a period of time as more historical engine starting system characteristics/data are collected. In the illustrated example, the threshold determination circuitry 214 also determines if a comparison result determined by the score generation circuitry 212 from the relationship between the ambient air temperature and the total starting crank time satisfies a second threshold. In some examples, the comparison result is a result of the analysis of the relationship between the ambient air temperature and total starting crank time (e.g., the integration under the curve). In some examples, the second threshold is predetermined for the engine starting system 102 (e.g., by the manufacturer). In other examples, the second threshold is adjusted over a period of time as more ambient air temperature and total starting crank time is determined for the machine 101.

In some examples, the starting system monitoring circuitry 110 includes means for determining if a score of the engine starting system or a comparison results satisfy a first threshold and a second threshold, respectively. For example, the means for determining may be implemented by the example threshold determination circuitry 214. In some examples, the threshold determination circuitry 214 may be implemented by machine executable instructions such as that implemented by at least blocks 412, 414 of FIG. 4 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the threshold determination circuitry 214 is implemented by other hardware logic circuitry, hardware implemented state machines, and/or any other combination of hardware, software, and/or firmware. For example, the threshold determination circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example alert determination circuitry 216 generates an alert to a user/operator of the machine 101 based on the results from the threshold determination circuitry 214. In some examples, the alert determination circuitry generates and displays an alert to the user/operator based on at least one of the score of the engine starting system or the comparison result from the relationship between the ambient air temperature and the total starting crank time. In some examples, if the threshold determination circuitry 214 determines the score of the health of the engine starting system 102 does not satisfy the first threshold (e.g., is less than or equal to the first threshold), then the alert determination circuitry 216 generates an alert for battery/engine degradation. In some examples, if the threshold determination circuitry 214 determines the comparison result does not satisfy the second threshold (e.g., is less than or equal to the second threshold), then the alert determination circuitry 216 generates the alert for battery/engine degradation. In the illustrated example, the alert determination circuitry 216 transmits the alert to the example user device 120 of FIG. 1 via the example network 114 of FIG. 1.

In some examples, the starting system monitoring circuitry 110 includes means for generating an alert. For example, the means for generating may be implemented by the example alert determination circuitry 216. In some examples, the alert determination circuitry 216 may be implemented by machine executable instructions such as that implemented by at least blocks 416, 418 of FIG. 4 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the alert determination circuitry 216 is implemented by other hardware logic circuitry, hardware implemented state machines, and/or any other combination of hardware, software, and/or firmware. For example, the alert determination circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the example training manager circuitry 218 generates the machine learning model used by the example start cycle comparison circuitry 208. The training manager circuitry 218 includes the example trainer circuitry 220 to collect the example historical engine starting system data 118 from the database 116 of FIG. 1. The trainer circuitry 220 identifies engine starting metrics associated with declining engine health from start cycles included in the historical engine starting system data 118. For example, the trainer circuitry 220 can identify metrics related to voltage of the engine battery (e.g., the example engine battery 104 of FIG. 1), power storage capacity of the engine battery, etc. that are indicative of declining engine health based on the historical engine starting system characteristics 118. In some examples, the trainer circuitry 220 also identifies metrics that are specifically indicative of declining battery health. For example, the trainer circuitry 220 identifies metrics from the historical engine starting system characteristics 118 associated with discharge events from the engine battery 104 over time. In some examples, voltage discharges from the engine battery 104 can indicate the state of the health of the engine battery 104 over time. For example, if the voltage of the engine battery 104 declines shortly after discharge over a period of time (e.g., after 5 or more discharge events), the health of the engine battery 104 may be declining. In another example, the engine battery 104 can be accidentally discharged by the machine 101 (e.g., the lights left on for an extended period of time without the engine running) while the engine battery 104 is being provided with a charging current (e.g., from an internal or external charging system). In such an example, the trainer circuitry 220 may determine a low-battery voltage (indicating a decline in battery health). However, the trainer circuitry 220 may monitor the battery voltage over time and determine that the engine battery 104 is charging normally (e.g., via an external battery charges or the engine starting system 102 starting the engine), which would indicate the battery is not failing.

Conversely, if an external charging system (or the internal charging system for the machine 101) applies a charging current to the engine battery 104, but the subsequent starting operation shows a very low starting voltage available, the trainer circuitry 220 would determine the engine battery 104 is likely in the process of failing. In examples disclosed herein, the trainer circuitry 220 collects the metrics from each of the start cycles and compares the metrics over time as the machine 101 is operated. In some examples, the trainer circuitry 220 compares the start cycles from the historical engine starting system characteristics 118 to determine measurable parameters (e.g., minimal battery voltage, duration of starting cranking time, initial battery voltage, battery voltage during/after a charging event, etc.) to develop a relationship of how the metrics vary with engine health, battery health, and temperature in the machine 101. In the illustrated example, the training manager circuitry 218 includes the example machine learning engine 222 to generate a machine learning model using the identified engine starting metrics from the trainer circuitry 220. The machine learning engine 222 stores the generated machine learning model in the model database 210. In some examples, the trainer circuitry 220 updates the identified engine starting metrics over time as more historical engine starting system characteristics 118 are collected, and the machine learning engine 222 updates the machine learning model.

In some examples, the starting system monitoring circuitry 110 includes means for identifying engine starting metrics. For example, the means for identifying may be implemented by the example trainer circuitry 220. In some examples, the trainer circuitry 220 may be implemented by machine executable instructions such as that implemented by at least blocks 302, 304, 308 of FIG. 3 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the trainer circuitry 220 is implemented by other hardware logic circuitry, hardware implemented state machines, and/or any other combination of hardware, software, and/or firmware. For example, the trainer circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the starting system monitoring circuitry 110 includes means for generating a machine learning model. For example, the means for generating may be implemented by the example machine learning engine 222. In some examples, the machine learning engine 222 may be implemented by machine executable instructions such as that implemented by at least block 306 of FIG. 3 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the machine learning engine 222 is implemented by other hardware logic circuitry, hardware implemented state machines, and/or any other combination of hardware, software, and/or firmware. For example, the machine learning engine 222 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the starting system monitoring circuitry 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example equipment sensor interface 202, the example database interface 204, the example data measurement circuitry 206, the example start cycle comparison circuitry 208, the example score generation circuitry 212, the example threshold determination circuitry 214, the example alert determination circuitry 216, the example trainer circuitry 220, the example machine learning engine 222 and/or, more generally, the example starting system monitoring circuitry 110 and the example training manager circuitry 218 of FIG. 2, may be implemented by hardware alone or by hardware in combination with software and/or firmware. Thus, for example, any of the example equipment sensor interface 202, the example database interface 204, the example data measurement circuitry 206, the example start cycle comparison circuitry 208, the example score generation circuitry 212, the example threshold determination circuitry 214, the example alert determination circuitry 216, the example trainer circuitry 220, the example machine learning engine 222 and/or, more generally, the example starting system monitoring circuitry 110 and the example training manager circuitry 218, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example starting system monitoring circuitry 110 and the example training manager circuitry 218 of FIG. 2 may include one or more elements, processes, and/or devices in addition to, or instead of, those illustrated in FIG. 6, and/or may include more than one of any or all of the illustrated elements, processes and devices.

Figure 3:
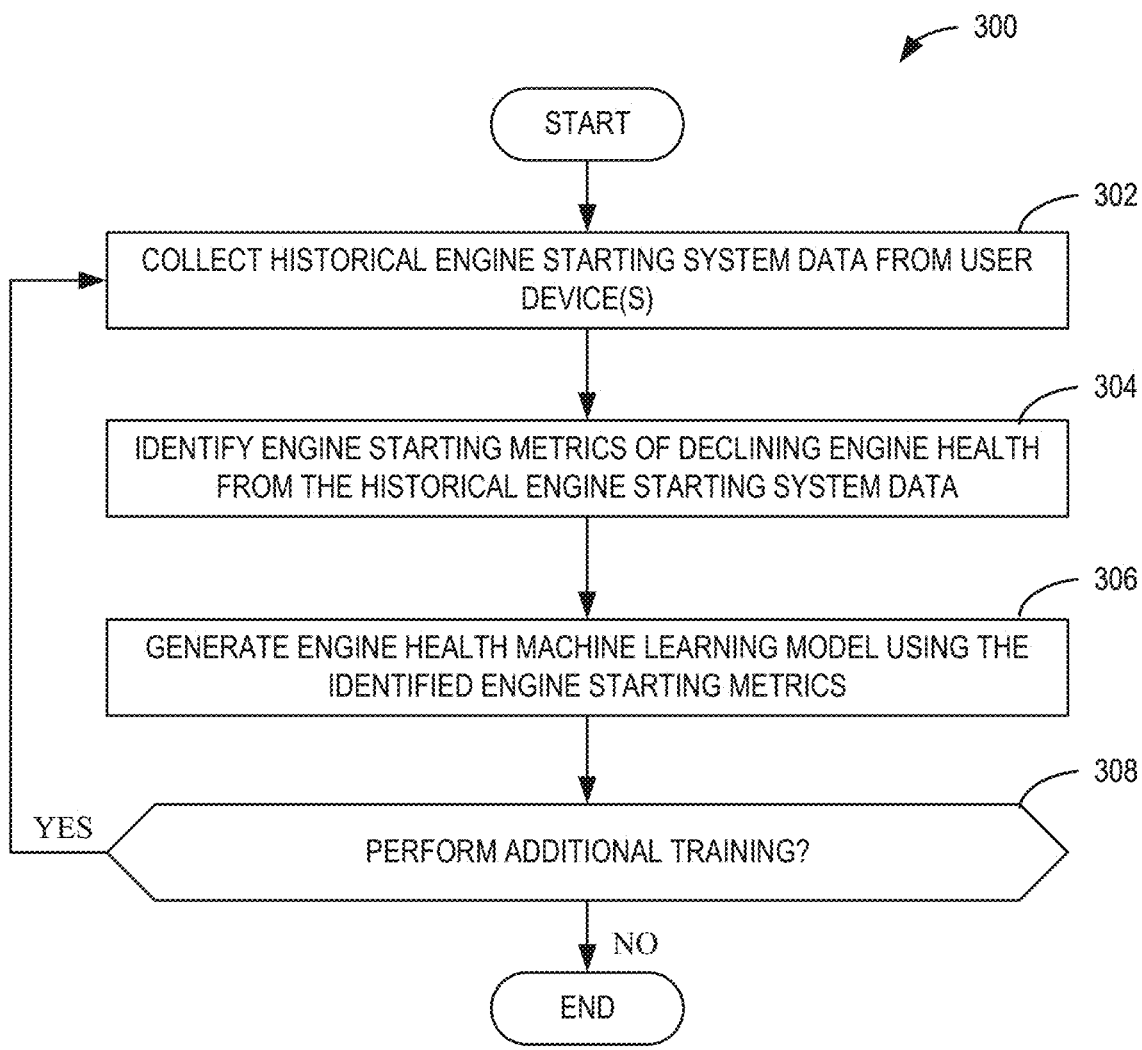
FIG. 3 is a flowchart representative of example machine readable instructions that may be executed by example processor circuitry to implement an example training manager circuitry of FIG. 2.
Figure 4:
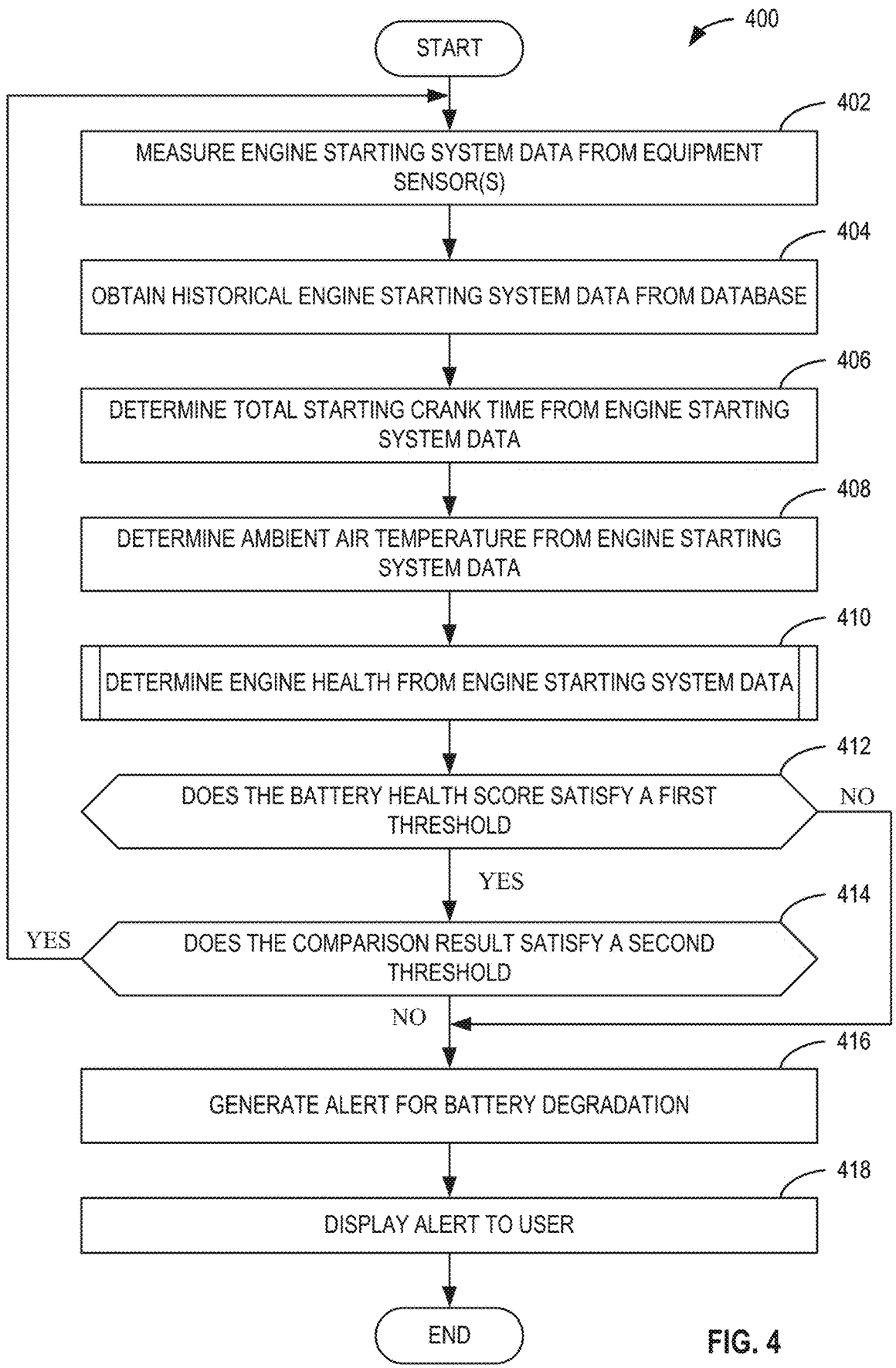
FIG. 4 is a flowchart representative of example machine readable instructions that may be executed by example processor circuitry to implement the example starting system monitoring circuitry of FIGS. 1 and/or 2.
Figure 5:
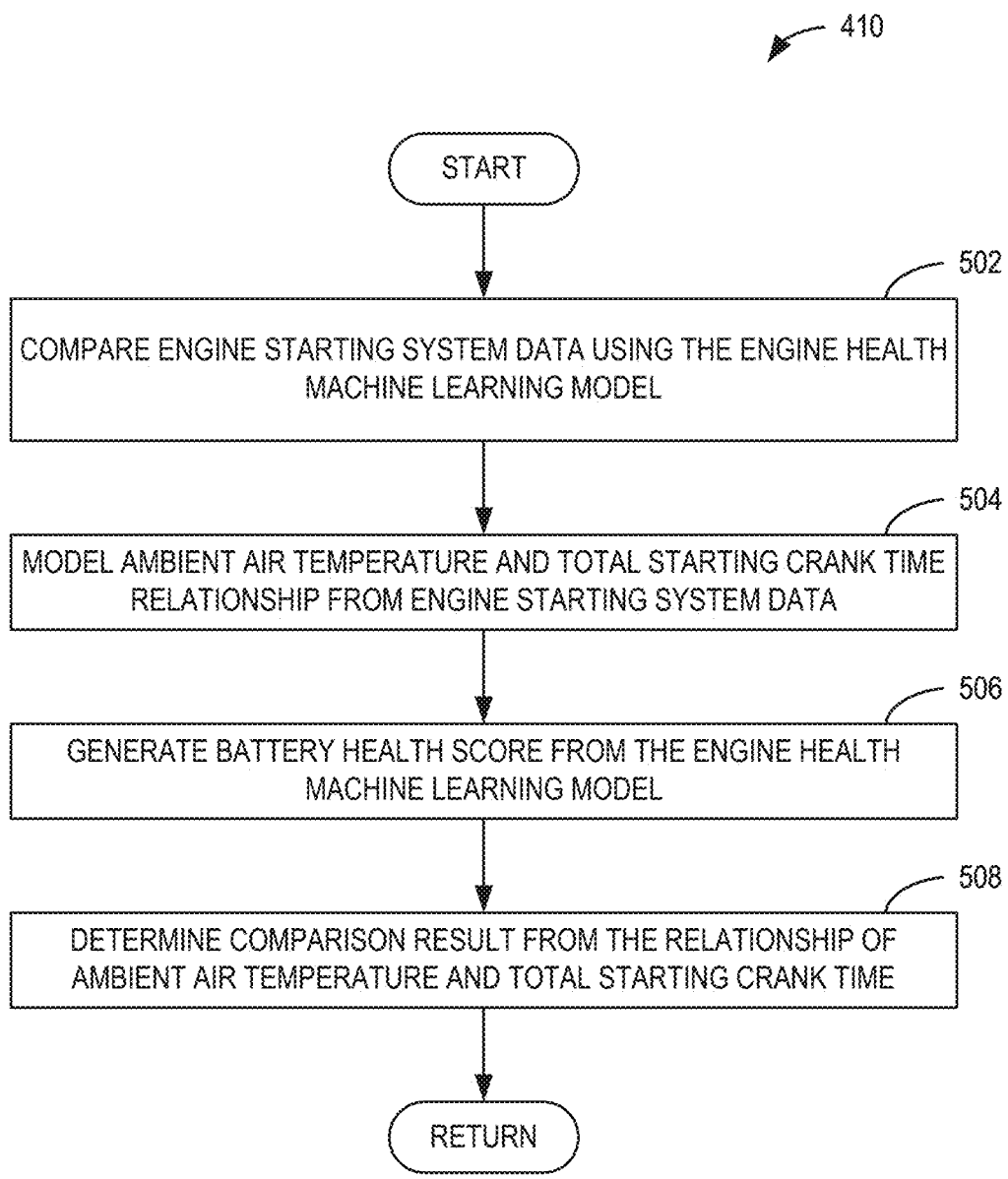
FIG. 5 is a flowchart representative of example machine readable instructions that may be executed by example processor circuitry to implement an example start cycle comparison circuitry and an example score generation circuitry included in the example starting system monitoring circuitry of FIG. 2.

Flowcharts representative of example hardware logic circuitry, machine readable instructions, hardware implemented state machines, and/or any combination thereof for implementing the starting system monitoring circuitry 110 and the example training manager circuitry 218 of FIG. 2 are shown in FIGS. 3-5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example starting system monitoring circuitry 110 and the example training manager circuitry 218 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to implement the example training manager circuitry 218 of FIG. 2. The machine readable instructions and/or operations 300 of FIG. 3 begin at block 302, at which the example trainer circuitry 220 collects historical engine starting system data from user device(s). The trainer circuitry 220 to collect the example historical engine starting system data 118 from the database 116 of FIG. 1. In some examples, the database 116 include engine starting system characteristics/data from the machine 101 as well as engine starting system characteristics/data from other machines/user devices that include engine starting systems.

At block 304, the example trainer circuitry 220 identifies engine starting metrics of declining engine health from the historical engine starting system data (e.g., historical engine starting system data 118). For example, the trainer circuitry 220 can identify metrics related to voltage of the engine battery (e.g., the example engine battery 104 of FIG. 1), power storage capacity of the engine battery, etc. that are indicative of declining engine health and/or battery health based on the historical engine starting system characteristics 118. In some examples, the trainer circuitry 220 compares the start cycles from the historical engine starting system characteristics 118 to determine measurable parameters (e.g., minimal battery voltage, duration of starting cranking time, initial battery voltage, battery voltage during/after a charging event, etc.) to develop a relationship of how the metrics vary with battery health and temperature in the machine 101.

At block 306, the example machine learning engine 222 generates an engine health machine learning model using the identified engine starting metrics. The machine learning engine 222 stores the generated machine learning model in the model database 210. At block 308, the example trainer circuitry 220 determines whether to perform additional training. In some examples, the trainer circuitry 220 updates the identified engine starting metrics over time as more historical engine starting system characteristics 118 are collected, and the machine learning engine 222 updates the machine learning model. If the example trainer circuitry 220 performs additional training, then process 300 returns to block 302 at which the example trainer circuitry 220 collects historical engine starting system data from user device(s). If the example trainer circuitry 220 does not perform additional training, then process 300 ends.

FIG. 4 is a flowchart representative of example machine readable instructions and/or example operations 400 that may be executed and/or instantiated by processor circuitry to implement the example starting system monitoring circuitry 110 of FIGS. 1 and/or 2. The machine readable instructions and/or operations 400 of FIG. 4 begin at block 402, at which the example equipment sensor interface 202 measures engine starting system data from the equipment sensor(s) (e.g., the example equipment sensor(s) 108 of FIG. 1). The equipment sensor interface 202 measures engine starting system characteristics/data from the example machine 101 of FIG. 1. The equipment sensor interface 202 collects the engine starting system characteristics/data from the example equipment sensor(s) 108 of FIG. 1. In examples disclosed herein, the engine starting system characteristics/data includes an initial voltage of the engine battery 104 of FIG. 1, voltage of the engine battery 104 during a start cycle, and the ambient air temperature of the engine starting system 102 of FIG. 1 during the start cycle. In some examples disclosed herein, the equipment sensor interface 202 may communicate via any suitable wired and/or wireless communication method to obtain the engine starting system characteristics from, at least, the equipment sensor(s) 108.

At block 404, the example database interface 204 obtains historical engine starting system data from the example database 116 of FIG. 1. The database interface 204 collects historical engine starting system data (e.g., the historical engine starting system characteristics 118 of FIG. 1) from the example database 116 of FIG. 1. In some examples, the database interface 204 collects the historical engine starting system data from a plurality of external devices (e.g., machines, user devices, etc.).

At block 406, the example data measurement circuitry 206 determines total starting crank time from the engine starting system data. The data measurement circuitry 206 determines a total starting crank time from the engine starting system characteristics/data. In examples disclosed herein, the total starting crank time is an amount of time between when a user/operator attempts to start the machine 101 (e.g., the user to attempt to start the machine 101 via a key, a button, etc.) and when the engine starting system 102 of the machine 101 starts. In some examples, the data measurement circuitry 206 determines the total starting crank time based on the engine starting system characteristics/data (e.g., the voltage of the engine battery 104, etc.). At block 408, the example data measurement circuitry 206 determines an ambient air temperature from the engine starting system data. At block 410, the example start cycle comparison circuitry 208 determines the engine health from the engine starting system data. As described in further detail below, the example flowchart 410 of FIG. 5 represents example instructions that may be implemented to determine the engine health from the engine starting system data.

At block 412, the example threshold determination circuitry 214 determines if a battery health score satisfies a first threshold. The example threshold determination circuitry 214 determines if the score of health of the engine starting system 102 from the start cycle comparison circuitry 208 satisfies a first threshold. In some examples, the first threshold is a minimum value of the score for the health of the engine starting system 102 without degradation (e.g., a minimum of the range considered healthy operations in the engine starting system 102). In some examples, the first threshold is predetermined for the engine starting system 102 (e.g., by a manufacturer). In other examples, the first threshold is adjusted over a period of time as more historical engine starting system characteristics/data are collected. If the example threshold determination circuitry 214 determines the battery health score does not satisfy the first threshold (e.g., is less than or equal to), then process 400 continues to block 416 at which the example alert determination circuitry 216 generates an alert for battery degradation.

If the example threshold determination circuitry 214 determines the battery health score satisfies the first threshold, then process 400 continues to block 414 at which the example threshold determination circuitry 214 determines if a comparison result satisfies a second threshold. The threshold determination circuitry 214 determines if a comparison result determined by the score generation circuitry 212 from the relationship between the ambient air temperature and the total starting crank time satisfies a second threshold. In some examples, the comparison result is a result of the analysis of the relationship between the ambient air temperature and total starting crank time (e.g., the integration under the curve). In some examples, the second threshold is predetermined for the engine starting system 102 (e.g., by the manufacturer). In other examples, the second threshold is adjusted over a period of time as more ambient air temperature and total starting crank time is determined for the machine 101. If the example threshold determination circuitry 214 determines the comparison result satisfies the second threshold, then process 400 returns to block 402 at which the example equipment sensor interface 202 measures engine starting system data from the equipment sensor(s).

If the example threshold determination circuitry 214 determines the comparison result does not satisfy the second threshold (less than or equal to), then process 400 continues to block 416 at which the example alert determination circuitry 216 generates an alert for battery degradation. The example alert determination circuitry 216 generates an alert to a user/operator of the machine 101 based on the results from the threshold determination circuitry 214. At block 418, the example alert determination circuitry 216 displays the alert to a user. In some examples, the alert determination circuitry generates and displays an alert to the user/operator based on at least one of the score of the engine starting system or the comparison result from the relationship between the ambient air temperature and the total starting crank time. In the illustrated example, the alert determination circuitry 216 transmits the alert to the example user device 120 of FIG. 1 via the example network 114 of FIG. 1. After block 418, process 400 ends.

FIG. 5 is a flowchart representative of example machine readable instructions and/or example operations 410 that may be executed and/or instantiated by processor circuitry to implement the example start cycle comparison circuitry 208 and the example score generation circuitry 212 included in the example starting system monitoring circuitry 110 of FIG. 2. The machine readable instructions and/or operations 410 of FIG. 5 begin at block 502, at which the example start cycle comparison circuitry 208 compares the engine starting system data using the engine health machine learning model. The start cycle comparison circuitry 208 applies a machine learning model to the engine measurements determined by the example data measurement circuitry 206. The start cycle comparison circuitry 208 compares the collected engine starting system characteristics/data and the historical engine starting system data 118 using the machine learning model. In some examples, the start cycle comparison circuitry 208 obtains the machine learning model from the example model database 210.

At block 504, the example start cycle comparison circuitry 208 models the ambient air temperature and total starting crank time relationship from the engine starting system data. In some examples, the start cycle comparison circuitry 208 models a relationship between the ambient air temperature and the total starting crank time determined by the data measurement circuitry 206. The start cycle comparison circuitry 208 maps how the ambient air temperature and the total starting crank time relate during the start cycle for the engine starting system 102 to determine the health of the engine starting system 102 of the machine 101.

At block 506, the example score generation circuitry 212 generates a battery health score from the engine health machine learning model. The example score generation circuitry 212 generates a score of the health of the engine starting system 102 from the machine learning model applied by the example start cycle comparison circuitry 208. At block 508, the example score generation circuitry 212 determines a comparison result from the relationship of ambient air temperature and total starting crank time. The score generation circuitry 212 determines a comparison result from the relationship between the ambient air temperature and the total starting crank time. In some examples, the score generation circuitry 212 performs an analysis of the relationship between the ambient air temperature and total starting crank time. For example, the score generation circuitry 212 integrates under a curve of the relationship between the ambient air temperature and the total starting crank time to determine power usage of the engine starting system 102. In some examples, the score generation circuitry 212 determines a storage capacity of the engine battery 104 of FIG. 1 based on the power usage of the engine starting system 102 over time during operation. After block 508, process 410 completes and returns to process 400 of FIG. 4.

Figure 6:
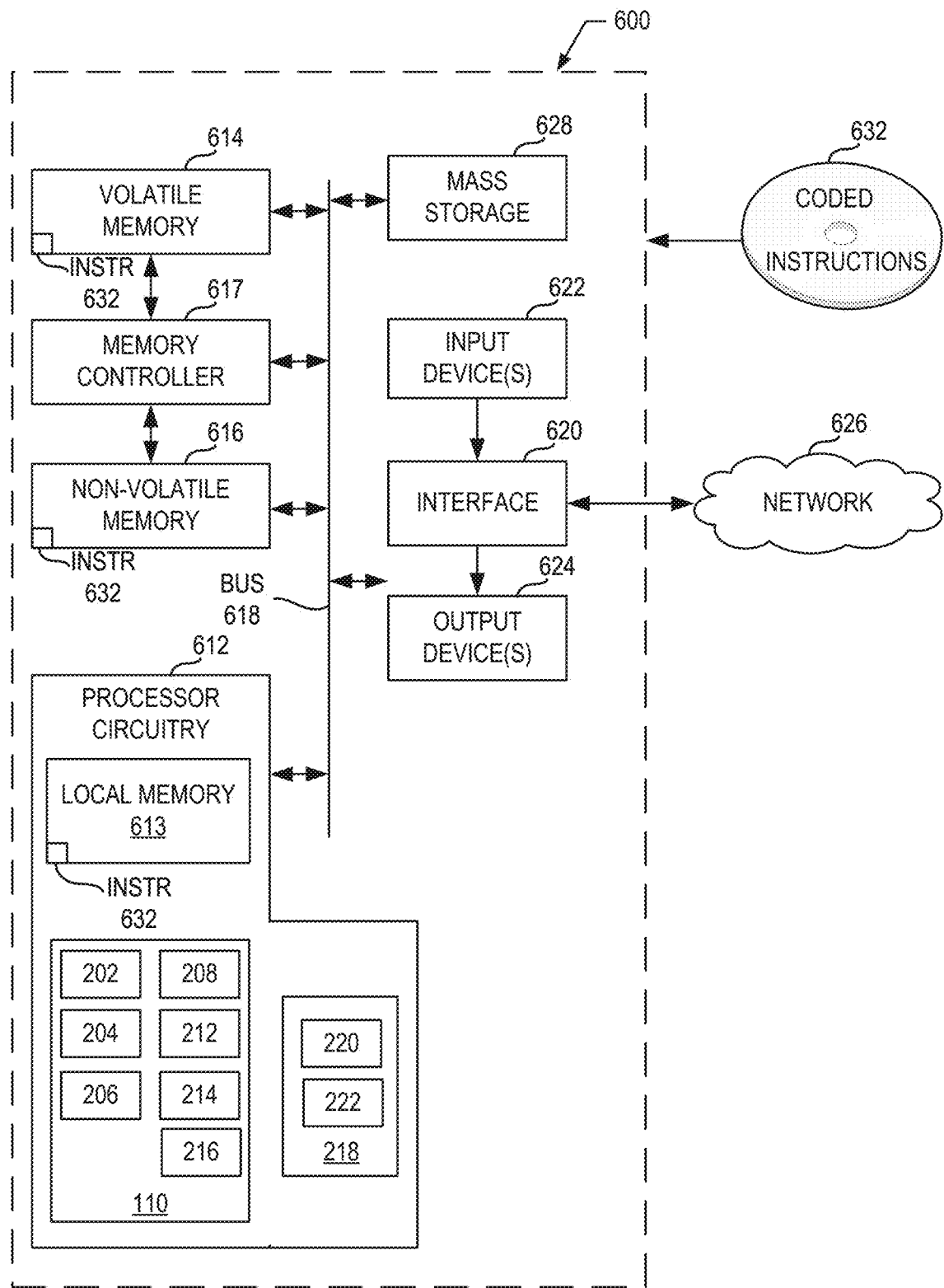
FIG. 6 is a block diagram of an example processing platform including processor circuitry structured to execute the example machine readable instructions of FIGS. 3, 4, and 5 to implement the example starting system monitoring circuitry of FIGS. 1 and/or 2.

FIG. 6 is a block diagram of an example processor platform 600 structured to execute and/or instantiate the machine readable instructions and/or operations of FIGS. 3-5 to implement the example starting system monitoring circuitry 110 and the example training manager circuitry 218 of FIG. 2. The processor platform 600 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example equipment sensor interface 202, the example database interface 204, the example data measurement circuitry 206, the example start cycle comparison circuitry 208, the example score generation circuitry 212, the example threshold determination circuitry 214, the example alert determination circuitry 216, the example trainer circuitry 220, and the example machine learning engine 222.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618.

The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIGS. 3-5, may be stored in the mass storage device 628, in the volatile memory 614, in the non-volatile memory 616, and/or on a removable non-transitory computer readable storage medium such as a CD or DVD.

Figure 7:
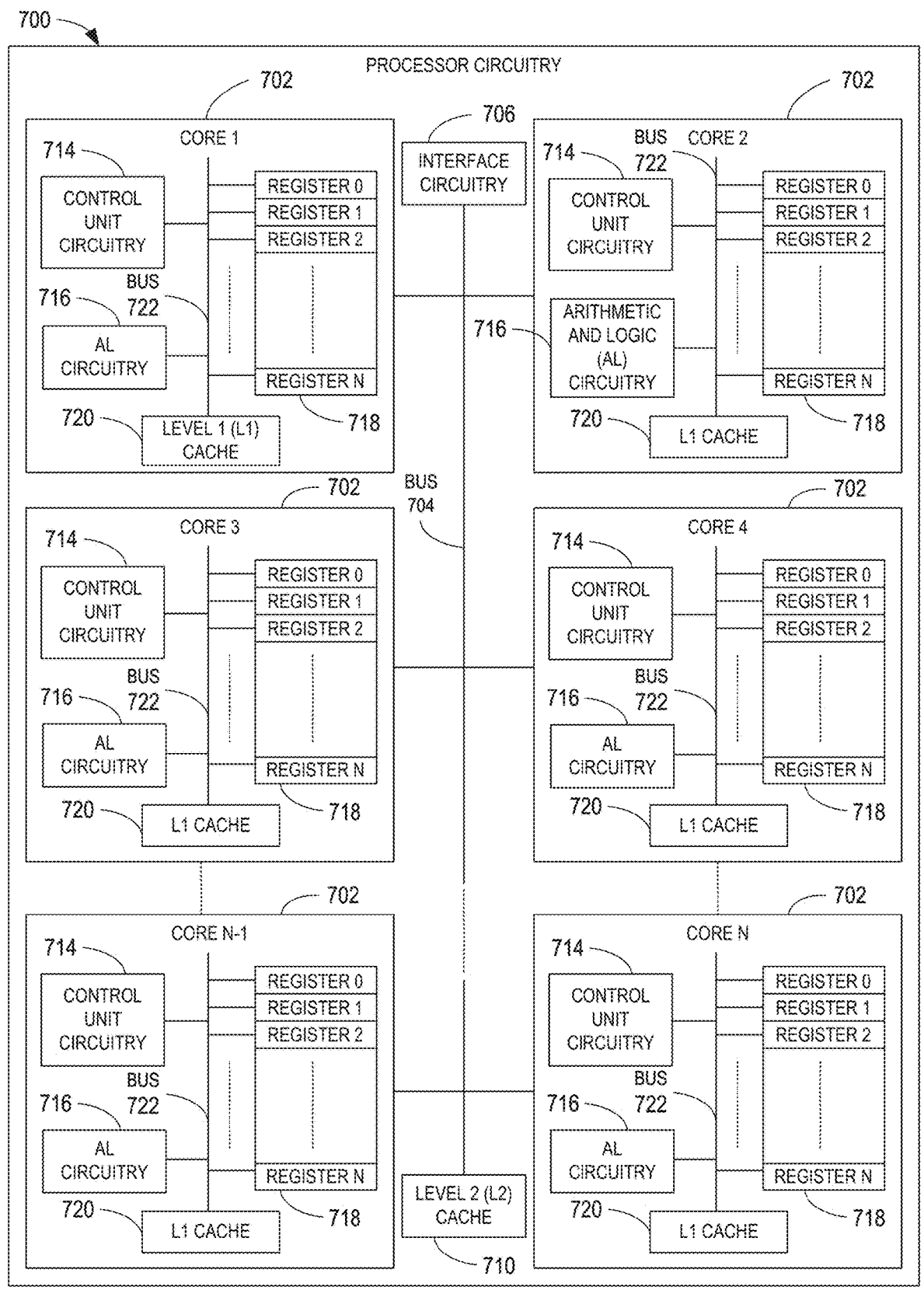
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3-5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 720 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
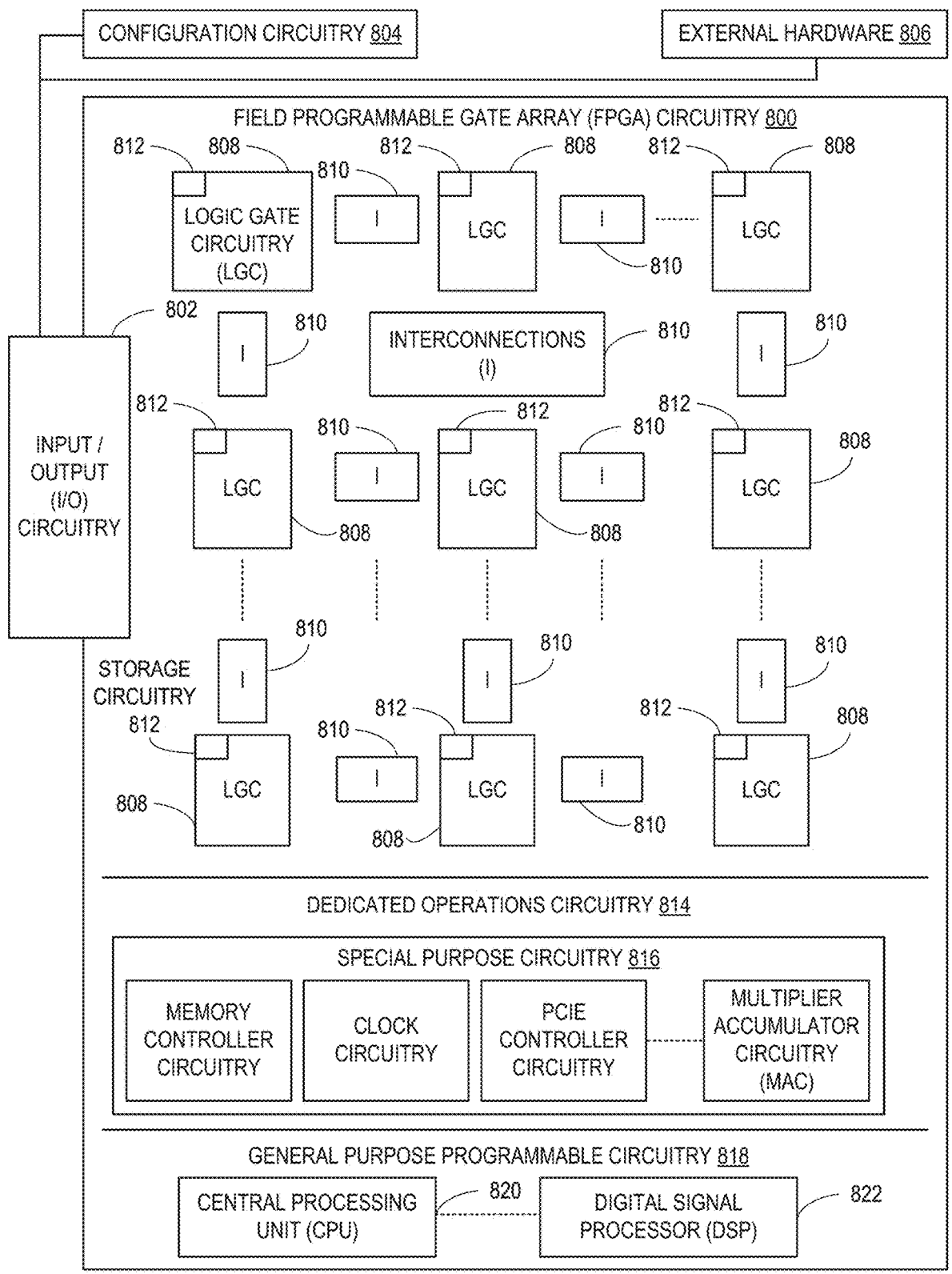
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 3-5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3-5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3-5. As such, the FPGA circuitry 800 may be structured to effectively instantiate some or all of the machine readable instructions of the flowcharts of FIGS. 3-5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3-5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIGS. 3-5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3-5 may be executed by one or more of the cores 702 of FIG. 7 and a second portion of the machine readable instructions represented by the flowcharts of FIGS. 3-5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
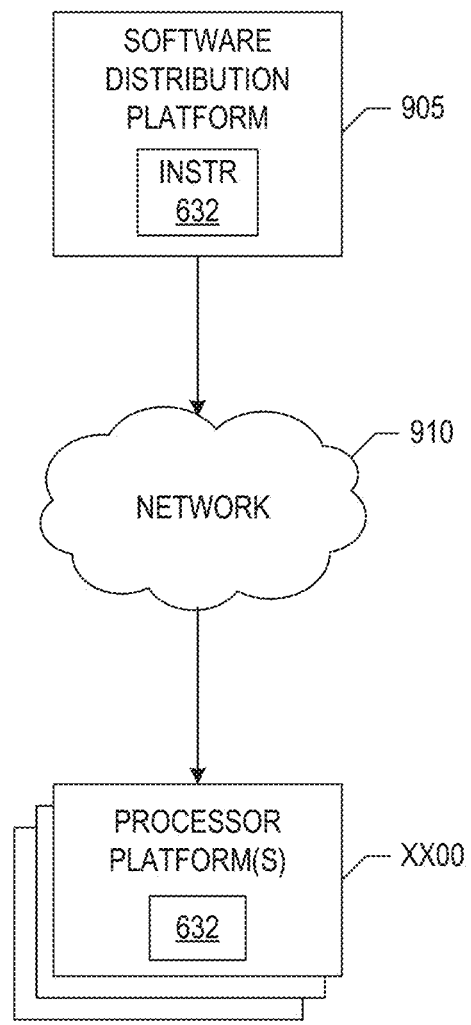
FIG. 9 is a block diagram of an example software distribution platform (e.g., one or more servers) to distribute software (e.g., software corresponding to the example machine readable instructions of FIGS. 3, 4, and 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 300, 400, 410 of FIGS. 3-5, as described above. The one or more servers of the example software distribution platform 905 are in communication with a network 910, which may correspond to any one or more of the Internet and/or any of the example network 626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 300, 400, 410 of FIGS. 3-5, may be downloaded to the example processor platform 600, which is to execute the machine readable instructions 632 to implement the example starting system monitoring circuitry 110 and the example training manager circuitry 218 of FIG. 2. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that monitor engine starting systems. The disclosed systems, methods, apparatus, and articles of manufacture improve the efficiency of the engine starting systems monitoring the engine starting system and corresponding equipment to identify engine starting characteristics indicative of degradation. The disclosed systems, methods, apparatus, and articles of manufacture use historical engine starting system characteristics to generate a model for determining the health of the engine starting system. The disclosed systems, methods, apparatus, and articles of manufacture determine a score of the health of the engine starting system based on the model and collected engine starting characteristics and use the score of the health of the engine starting system to identify potential degradation of the components (e.g., the battery, cables, the starter motor, etc.). The disclosed systems, methods, apparatus, and articles of manufacture allow for a product/machine operator to identify degradation in the components of the engine starting system before failure of the equipment, which allows time for servicing or replacement of the degrading component without losing operation of the product/machine.

Example methods, apparatus, systems, and articles of manufacture to monitor engine starting systems are disclosed herein. Further examples and combinations thereof include the following:

Example 1 includes an apparatus comprising at least one memory, instructions in the apparatus, and processor circuitry to execute the instructions to measure engine starting system data from a machine, determine a total starting crank time and an ambient air temperature for the machine from the engine starting system data, compare the engine starting system data using a machine learning model, model a relationship between the ambient air temperature and the total starting crank time, generate a score of an engine starting system from the machine learning model, determine comparison result from the relationship between the ambient air temperature and the total starting crank time, and display an alert to a user based on at least one of the score of the engine starting system or the comparison result from the relationship between the ambient air temperature and the total starting crank time.

Example 2 includes the apparatus of example 1, wherein the processor circuitry is to execute the instructions to measure the engine starting system data from an engine battery, a starter motor, and a plurality of equipment sensors, the plurality of equipment sensors including an ambient air temperature sensor.

Example 3 includes the apparatus of example 2, wherein the engine starting system data includes at least one of an initial voltage of the engine battery, voltage of the engine battery during a start cycle, and the ambient air temperature during the start cycle.

Example 4 includes the apparatus of example 1, wherein the total starting crank time is an amount of time between when a user attempts to start the machine and when the engine starting system of the machine starts, the user to attempt to start the machine via at least one of a key or a button.

Example 5 includes the apparatus of example 1, wherein the processor circuitry is to execute the instructions to collect historical engine starting system data from at least one user device, identify engine starting metrics associated with at least one of declining engine health or declining battery health from start cycles included in the historical engine starting system data, and generate the machine learning model using the identified engine starting metrics.

Example 6 includes the apparatus of example 1, wherein the processor circuitry is to execute the instructions to map how the ambient air temperature and the total starting crank time relate for a plurality of start cycles to determine health of an engine starting system of the machine.

Example 7 includes the apparatus of example 6, wherein the processor circuitry is to execute the instructions to determine the health of the engine starting system of the machine by performing an analysis of under a curve from the relationship between the ambient air temperature and the total starting crank time.

Example 8 includes the apparatus of example 1, wherein the processor circuitry is to execute the instructions to determine if the score of the engine starting system from the machine learning model satisfies a first threshold.

Example 9 includes the apparatus of example 8, wherein the processor circuitry is to execute the instructions to determine if the comparison result from the relationship between the ambient air temperature and the total starting crank time satisfies a second threshold.

Example 10 includes the apparatus of example 9, wherein the processor circuitry is to execute the instructions to generate the alert in response to at least one of (a) the score of the engine starting system from the machine learning model does not satisfy the first threshold or (b) the comparison results from the relationship between the ambient air temperature and the total starting crank time does not satisfy the second threshold.

Example 11 includes the apparatus of example 1, wherein the processor circuitry is to execute the instructions to display the alert to the user via at least one of an application on a user device, a notification in a cloud environment, or an email to the user.

Example 12 includes a non-transitory computer readable medium comprising instructions which, when executed, cause at least one processor to measure engine starting system data from a machine, determine a total starting crank time and an ambient air temperature for the machine from the engine starting system data, compare the engine starting system data using a machine learning model, model a relationship between the ambient air temperature and the total starting crank time, generate a score of an engine starting system from the machine learning model, determine comparison result from the relationship between the ambient air temperature and the total starting crank time, and display an alert to a user based on at least one of the score of the engine starting system or the comparison result from the relationship between the ambient air temperature and the total starting crank time.

Example 13 includes the non-transitory computer readable medium of example 12, wherein the instructions, when executed, cause the at least one processor to measure the engine starting system data from an engine battery, a starter motor, and a plurality of equipment sensors, the plurality of equipment sensors including an ambient air temperature sensor.

Example 14 includes the non-transitory computer readable medium of example 13, wherein the engine starting system data includes at least one of an initial voltage of the engine battery, voltage of the engine battery during a start cycle, and the ambient air temperature during the start cycle.

Example 15 includes the non-transitory computer readable medium of example 12, wherein the total starting crank time is an amount of time between when a user attempts to start the machine and when the engine starting system of the machine starts, the user to attempt to start the machine via at least one of a key or a button.

Example 16 includes the non-transitory computer readable medium of example 12, wherein the instructions, when executed, cause the at least one processor to collect historical engine starting system data from at least one user device, identify engine starting metrics associated with at least one of declining engine health or declining battery health from start cycles included in the historical engine starting system data, and generate the machine learning model using the identified engine starting metrics.

Example 17 includes the non-transitory computer readable medium of example 12, wherein the instructions, when executed, cause the at least one processor to map how the ambient air temperature and the total starting crank time relate for a plurality of start cycles to determine health of an engine starting system of the machine.

Example 18 includes the non-transitory computer readable medium of example 17, wherein the instructions, when executed, cause the at least one processor to determine the health of the engine starting system of the machine by performing an analysis of under a curve from the relationship between the ambient air temperature and the total starting crank time.

Example 19 includes the non-transitory computer readable medium of example 12, wherein the instructions, when executed, cause the at least one processor to determine if the score of the engine starting system from the machine learning model satisfies a first threshold.

Example 20 includes the non-transitory computer readable medium of example 19, wherein the instructions, when executed, cause the at least one processor to determine if the comparison result from the relationship between the ambient air temperature and the total starting crank time satisfies a second threshold.

Example 21 includes the non-transitory computer readable medium of example 20, wherein the instructions, when executed, cause the at least one processor to generate the alert in response to at least one of (a) the score of the engine starting system from the machine learning model does not satisfy the first threshold or (b) the comparison results from the relationship between the ambient air temperature and the total starting crank time does not satisfy the second threshold.

Example 22 includes the non-transitory computer readable medium of example 12, wherein the instructions, when executed, cause the at least one processor to display the alert to the user via at least one of an application on a user device, a notification in a cloud environment, or an email to the user.

Example 23 includes a method comprising measuring engine starting system data from a machine, determining a total starting crank time and an ambient air temperature for the machine from the engine starting system data, comparing the engine starting system data using a machine learning model, modeling a relationship between the ambient air temperature and the total starting crank time, generating a score of an engine starting system from the machine learning model, determining comparison result from the relationship between the ambient air temperature and the total starting crank time, and displaying an alert to a user based on at least one of the score of the engine starting system or the comparison result from the relationship between the ambient air temperature and the total starting crank time.

Example 24 includes the method of example 23, further including measuring the engine starting system data from an engine battery, a starter motor, and a plurality of equipment sensors, the plurality of equipment sensors including an ambient air temperature sensor.

Example 25 includes the method of example 24, wherein the engine starting system data includes at least one of an initial voltage of the engine battery, voltage of the engine battery during a start cycle, and the ambient air temperature during the start cycle.

Example 26 includes the method of example 23, wherein the total starting crank time is an amount of time between when a user attempts to start the machine and when the engine starting system of the machine starts, the user to attempt to start the machine via at least one of a key or a button.

Example 27 includes the method of example 23, further including collecting historical engine starting system data from at least one user device, identifying engine starting metrics associated with at least one of declining engine health or declining battery health from start cycles included in the historical engine starting system data, and generating the machine learning model using the identified engine starting metrics.

Example 28 includes the method of example 23, further including mapping how the ambient air temperature and the total starting crank time relate for a plurality of start cycles to determine health of an engine starting system of the machine.

Example 29 includes the method of example 28, further including determining the health of the engine starting system of the machine by performing an analysis of under a curve from the relationship between the ambient air temperature and the total starting crank time.

Example 30 includes the method of example 23, further including determining if the score of the engine starting system from the machine learning model satisfies a first threshold.

Example 31 includes the method of example 30, further including determining if the comparison result from the relationship between the ambient air temperature and the total starting crank time satisfies a second threshold.

Example 32 includes the method of example 31, further including generating the alert in response to at least one of (a) the score of the engine starting system from the machine learning model does not satisfy the first threshold or (b) the comparison results from the relationship between the ambient air temperature and the total starting crank time does not satisfy the second threshold.

Example 33 includes the method of example 23, further including displaying the alert to the user via at least one of an application on a user device, a notification in a cloud environment, or an email to the user. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine-readable instructions; and
   processor circuitry to execute the machine-readable instructions to:
   measure engine starting system data from a machine;
   collect historical engine starting system data from at least one user device;
   identify engine starting metrics associated with at least one of declining engine health or declining battery health from start cycles included in the historical engine starting system data;
   determine a total starting crank time and an ambient air temperature for the machine from the engine starting system data;
   compare the engine starting system data using a machine learning model;
   model a relationship between the ambient air temperature and the total starting crank time;
   generate a score of an engine starting system from the machine learning model;
   determine a comparison result from the relationship between the ambient air temperature and the total starting crank time; and
   display an alert to a user based on at least one of the score of the engine starting system or the comparison result from the relationship between the ambient air temperature and the total starting crank time.

2. The apparatus of claim 1, wherein the total starting crank time is an amount of time between when a user attempts to start the machine and when the engine starting system of the machine starts, the user to attempt to start the machine via at least one of a key or a button.

3. The apparatus of claim 1, wherein the processor circuitry is to execute the machine-readable instructions to display the alert to the user via at least one of an application on a user device, a notification in a cloud environment, or an email to the user.

4. The apparatus of claim 1, wherein the processor circuitry is to execute the machine-readable instructions to measure the engine starting system data from an engine battery, a starter motor, and a plurality of equipment sensors, the plurality of equipment sensors including an ambient air temperature sensor.

5. The apparatus of claim 4, wherein the engine starting system data includes at least one of an initial voltage of the engine battery, voltage of the engine battery during a start cycle, and the ambient air temperature during the start cycle.

6. The apparatus of claim 1, wherein the processor circuitry is to execute the machine-readable instructions to map how the ambient air temperature and the total starting crank time relate for a plurality of start cycles to determine health of an engine starting system of the machine.

7. The apparatus of claim 6, wherein the processor circuitry is to execute the machine-readable instructions to determine the health of the engine starting system of the machine by performing an analysis of under a curve from the relationship between the ambient air temperature and the total starting crank time.

8. The apparatus of claim 1, wherein the processor circuitry is to execute the machine-readable instructions to determine if the score of the engine starting system from the machine learning model satisfies a first threshold.

9. The apparatus of claim 8, wherein the processor circuitry is to execute the machine-readable instructions to determine if the comparison result from the relationship between the ambient air temperature and the total starting crank time satisfies a second threshold.

10. The apparatus of claim 9, wherein the processor circuitry is to execute the machine-readable instructions to generate the alert in response to at least one of (a) the score of the engine starting system from the machine learning model does not satisfy the first threshold or (b) the comparison result from the relationship between the ambient air temperature and the total starting crank time does not satisfy the second threshold.

11. A non-transitory computer readable medium comprising instructions which, when executed, cause at least one processor to:
measure engine starting system data from a machine;
collect historical engine starting system data from at least one user device;
identify engine starting metrics associated with at least one of declining health or declining battery health from start cycles included in the historical engine starting system data;
determine a total starting crank time and an ambient air temperature for the machine from the engine starting system data;
compare the engine starting system data using a machine learning model;
model a relationship between the ambient air temperature and the total starting crank time;
generate a score of an engine starting system from the machine learning model;
determine a comparison result from the relationship between the ambient air temperature and the total starting crank time; and
display an alert to a user based on at least one of the score of the engine starting system or the comparison result from the relationship between the ambient air temperature and the total starting crank time.

12. The non-transitory computer readable medium of claim 11, wherein the total starting crank time is an amount of time between when a user attempts to start the machine and when the engine starting system of the machine starts, the user to attempt to start the machine via at least one of a key or a button.

13. The non-transitory computer readable medium of claim 11, wherein the instructions, when executed, cause the at least one processor to display the alert to the user via at least one of an application on a user device, a notification in a cloud environment, or an email to the user.

14. The non-transitory computer readable medium of claim 11, wherein the instructions, when executed, cause the at least one processor to measure the engine starting system data from an engine battery, a starter motor, and a plurality of equipment sensors, the plurality of equipment sensors including an ambient air temperature sensor.

15. The non-transitory computer readable medium of claim 14, wherein the engine starting system data includes at least one of an initial voltage of the engine battery, voltage of the engine battery during a start cycle, and the ambient air temperature during the start cycle.

16. The non-transitory computer readable medium of claim 11, wherein the instructions, when executed, cause the at least one processor to map how the ambient air temperature and the total starting crank time relate for a plurality of start cycles to determine health of an engine starting system of the machine.

17. The non-transitory computer readable medium of claim 16, wherein the instructions, when executed, cause the at least one processor to determine the health of the engine starting system of the machine by performing an analysis of under a curve from the relationship between the ambient air temperature and the total starting crank time.

18. The non-transitory computer readable medium of claim 11, wherein the instructions, when executed, cause the at least one processor to determine if the score of the engine starting system from the machine learning model satisfies a first threshold.

19. The non-transitory computer readable medium of claim 18, wherein the instructions, when executed, cause the at least one processor to determine if the comparison result from the relationship between the ambient air temperature and the total starting crank time satisfies a second threshold.

20. The non-transitory computer readable medium of claim 19, wherein the instructions, when executed, cause the at least one processor to generate the alert in response to at least one of (a) the score of the engine starting system from the machine learning model does not satisfy the first threshold or (b) the comparison result from the relationship between the ambient air temperature and the total starting crank time does not satisfy the second threshold.

21. A method comprising:
measuring engine starting system data from a machine;
collecting historical engine starting system data from at least one user device;
identifying engine starting metrics associated with at least one of declining engine health or declining battery health from start cycles included in the historical engine starting system data;
determining a total starting crank time and an ambient air temperature for the machine from the engine starting system data;
comparing the engine starting system data using a machine learning model;
modeling a relationship between the ambient air temperature and the total starting crank time;
generating a score of an engine starting system from the machine learning model;
determining a comparison result from the relationship between the ambient air temperature and the total starting crank time; and
displaying an alert to a user based on at least one of the score of the engine starting system or the comparison result from the relationship between the ambient air temperature and the total starting crank time.

22. The method of claim 21, further including displaying the alert to the user via at least one of an application on a user device, a notification in a cloud environment, or an email to the user.

23. The method of claim 21, wherein the total starting crank time is an amount of time between when a user attempts to start the machine and when the engine starting system of the machine starts, the user to attempt to start the machine via at least one of a key or a button.

24. The method of claim 21, further including measuring the engine starting system data from an engine battery, a starter motor, and a plurality of equipment sensors, the plurality of equipment sensors including an ambient air temperature sensor.

25. The method of claim 24, wherein the engine starting system data includes at least one of an initial voltage of the engine battery, voltage of the engine battery during a start cycle, and the ambient air temperature during the start cycle.

26. The method of claim 21, further including mapping how the ambient air temperature and the total starting crank time relate for a plurality of start cycles to determine health of an engine starting system of the machine.

27. The method of claim 26, further including determining the health of the engine starting system of the machine by performing an analysis of under a curve from the relationship between the ambient air temperature and the total starting crank time.

28. The method of claim 21, further including determining if the score of the engine starting system from the machine learning model satisfies a first threshold.

29. The method of claim 28, further including determining if the comparison result from the relationship between the ambient air temperature and the total starting crank time satisfies a second threshold.

30. The method of claim 29, further including generating the alert in response to at least one of (a) the score of the engine starting system from the machine learning model does not satisfy the first threshold or (b) the comparison result from the relationship between the ambient air temperature and the total starting crank time does not satisfy the second threshold.

* * * * *